United States Patent
Kim et al.

(10) Patent No.: US 11,335,117 B2
(45) Date of Patent: May 17, 2022

(54) METHOD AND APPARATUS WITH FAKE FINGERPRINT DETECTION

(71) Applicant: Samsung Electronics Co., Ltd., Suwon-si (KR)

(72) Inventors: Jiwhan Kim, Seongnam-si (KR); Sungun Park, Suwon-si (KR); Kyuhong Kim, Seoul (KR); Geuntae Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/137,163

(22) Filed: Dec. 29, 2020

(65) Prior Publication Data

US 2022/0012464 A1 Jan. 13, 2022

(30) Foreign Application Priority Data

Jul. 13, 2020 (KR) .................. 10-2020-0086089

(51) Int. Cl.
| | |
|---|---|
| G06V 40/12 | (2022.01) |
| G06N 3/08 | (2006.01) |
| G06F 16/56 | (2019.01) |
| G06N 3/04 | (2006.01) |
| G06F 21/32 | (2013.01) |
| G06V 40/13 | (2022.01) |
| G06V 40/50 | (2022.01) |

(52) U.S. Cl.
CPC .......... *G06V 40/1388* (2022.01); *G06F 16/56* (2019.01); *G06F 21/32* (2013.01); *G06N 3/04* (2013.01); *G06N 3/08* (2013.01); *G06V 40/13* (2022.01); *G06V 40/50* (2022.01)

(58) Field of Classification Search
CPC .... G06V 40/1388; G06V 40/13; G06V 40/50; G06F 16/56; G06F 21/32; G06N 3/04; G06N 3/08
See application file for complete search history.

(56) References Cited

U.S. PATENT DOCUMENTS

| | | | |
|---|---|---|---|
| 10,373,023 B1 | 8/2019 | Kim et al. | |
| 2018/0129857 A1* | 5/2018 | Bonev | ............... G06K 9/00087 |
| 2018/0225495 A1* | 8/2018 | Jonsson | .................. G06K 9/22 |

(Continued)

FOREIGN PATENT DOCUMENTS

| | | |
|---|---|---|
| CN | 110084281 A | 8/2019 |
| JP | 6403861 B1 | 9/2018 |

(Continued)

OTHER PUBLICATIONS

Rohit Gajawada et al. "Universal Material Translator: Towards Spoof Fingerprint Generalization" *IIIT Hyderabad, India Michigan State University, USA, 2019 International Conference on Biometrics, Crete, Greece* (8 pages in English).

*Primary Examiner* — Premal R Patel
(74) *Attorney, Agent, or Firm* — NSIP Law

(57) ABSTRACT

A processor-implemented method includes: obtaining an enrollment fingerprint embedding vector corresponding to an enrollment fingerprint image; and generating a virtual enrollment fingerprint embedding vector, wherein the virtual enrollment fingerprint embedding vector has an environmental characteristic different from an environmental characteristic of the enrollment fingerprint image, and has a structural characteristic of the enrollment fingerprint image.

25 Claims, 13 Drawing Sheets

(56) References Cited

U.S. PATENT DOCUMENTS

| | | | |
|---|---|---|---|
| 2019/0005217 A1* | 1/2019 | Kim | G06K 9/22 |
| 2019/0189180 A1 | 6/2019 | Ge et al. | |
| 2019/0244138 A1 | 8/2019 | Bhowmick et al. | |
| 2019/0251612 A1 | 8/2019 | Fang et al. | |
| 2019/0278895 A1* | 9/2019 | Streit | G06F 21/602 |
| 2020/0034524 A1 | 1/2020 | Han | |
| 2020/0349247 A1* | 11/2020 | Seo | A61B 5/0006 |

FOREIGN PATENT DOCUMENTS

| | | |
|---|---|---|
| KR | 10-1975186 B1 | 5/2019 |
| KR | 10-2019-0116035 A | 10/2019 |
| WO | WO 2019/078769 A1 | 4/2019 |

\* cited by examiner

METHOD AND APPARATUS WITH FAKE FINGERPRINT DETECTION

CROSS-REFERENCE TO RELATED APPLICATIONS

This application claims the benefit under 35 U.S.C. § 119(a) of Korean Patent Application No. 10-2020-0086089, filed on Jul. 13, 2020 in the Korean Intellectual Property Office, the entire disclosure of which is incorporated herein by reference for all purposes.

BACKGROUND

1. Field

The following description relates to a method and apparatus with fake fingerprint detection. For example, the following description relates to a method with generation of virtual fingerprints associated with various environments and detection of a fake fingerprint based on the generated virtual fingerprints.

2. Description of Related Art

Fingerprint recognition technology has been used for security verification of a user of a device. In general fingerprint recognition, user authentication or verification may be performed by obtaining a fingerprint image of a user through a sensor and comparing the obtained fingerprint image to a pre-registered fingerprint image. When a finely fabricated fake fingerprint pattern is input to the sensor, a fingerprint recognizing apparatus may not distinguish the fake fingerprint pattern from a genuine fingerprint pattern. Thus, the fingerprint recognizing apparatus may recognize the fake fingerprint pattern as a biometric fingerprint. For example, when an artificially made, fake fingerprint formed by a material such as rubber, silicon, gelatin, epoxy, and latex on which a fingerprint pattern is engraved makes a contact with the sensor, the fingerprint pattern engraved on such a material may be recognized as a human fingerprint. Distinguishing an artificially made, fake fingerprint from a genuine human fingerprint may be important.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes: obtaining an enrollment fingerprint embedding vector corresponding to an enrollment fingerprint image; and generating a virtual enrollment fingerprint embedding vector, wherein the virtual enrollment fingerprint embedding vector has an environmental characteristic different from an environmental characteristic of the enrollment fingerprint image, and has a structural characteristic of the enrollment fingerprint image.

The method may further include: receiving an input fingerprint image; and determining whether an input fingerprint included in the input fingerprint image is a fake fingerprint based on a fake fingerprint embedding vector that is provided in advance, the enrollment fingerprint embedding vector, and the virtual enrollment fingerprint embedding vector.

The generating of the virtual enrollment fingerprint embedding vector may include: obtaining a virtual enrollment fingerprint image by inputting the enrollment fingerprint image to an artificial neural network (ANN); and generating the virtual enrollment fingerprint embedding vector corresponding to the virtual enrollment fingerprint image.

The generating of the virtual enrollment fingerprint embedding vector may include generating a plurality of virtual enrollment fingerprint embedding vector sets having different environmental characteristics by inputting the enrollment fingerprint image to a plurality of artificial neural networks (ANNs).

The method may further include generating a virtual fake fingerprint embedding vector by inputting the enrollment fingerprint image to an artificial neural network (ANN).

The method may further include: receiving an input fingerprint image; and determining whether an input fingerprint included in the input fingerprint image is a fake fingerprint, based on a fake fingerprint embedding vector that is provided in advance, the enrollment fingerprint embedding vector, the virtual enrollment fingerprint embedding vector, and the virtual fake fingerprint embedding vector.

In another general aspect, a non-transitory computer-readable storage medium may store instructions that, when executed by a processor, cause the processor to perform the method described above.

In another general aspect, a processor-implemented method includes: receiving an input fingerprint image; and determining whether an input fingerprint included in the input fingerprint image is a fake fingerprint, based on a fake fingerprint embedding vector, an enrollment fingerprint embedding vector, and a virtual enrollment fingerprint embedding vector that are provided in advance, wherein the enrollment fingerprint embedding vector is obtained based on an enrollment fingerprint image, and the virtual enrollment fingerprint embedding vector is generated by inputting the enrollment fingerprint image to an artificial neural network (ANN).

The virtual enrollment fingerprint embedding vector may be generated to have an environmental characteristic different from an environmental characteristic of the enrollment fingerprint image and maintain a structural characteristic of the enrollment fingerprint image.

The method may further include: obtaining an input fingerprint embedding vector corresponding to the input fingerprint image, wherein the determining of whether the input fingerprint is the fake fingerprint includes: determining a confidence value of the input fingerprint embedding vector based on the fake fingerprint embedding vector, the enrollment fingerprint embedding vector and the virtual enrollment fingerprint embedding vector; and determining, based on the confidence value, whether the input fingerprint is the fake fingerprint.

The method may further include: performing user authentication based on a result of the determining of whether the input fingerprint is the fake fingerprint; and determining whether to provide a user access to one or more features or operations of an apparatus, based on a result of the user authentication.

In another general aspect, a non-transitory computer-readable storage medium may store instructions that, when executed by a processor, cause the processor to perform the method described above.

In another general aspect, an apparatus includes: one or more processors configured to: obtain an enrollment fingerprint embedding vector corresponding to an enrollment fingerprint image; and generate a virtual enrollment fingerprint embedding vector, wherein the virtual enrollment fingerprint embedding vector has an environmental characteristic different from an environmental characteristic of the enrollment fingerprint image, and has a structural characteristic of the enrollment fingerprint image.

The apparatus may further include: a sensor configured to receive an input fingerprint image, wherein the one or more processors are further configured to determine whether an input fingerprint included in the input fingerprint image is a fake fingerprint, based on a fake fingerprint embedding vector that is provided in advance, the enrollment fingerprint embedding vector, and the virtual enrollment fingerprint embedding vector.

The one or more processors may be further configured to: obtain a virtual enrollment fingerprint image by inputting the enrollment fingerprint image to an artificial neural network (ANN); and generate the virtual enrollment fingerprint embedding vector corresponding to the virtual enrollment fingerprint image.

The one or more processors may be further configured to generate a plurality of virtual enrollment fingerprint embedding vector sets having different environmental characteristics by inputting the enrollment fingerprint image to a plurality of artificial neural networks (ANNs).

The one or more processors may be further configured to generate a virtual fake fingerprint embedding vector by inputting the enrollment fingerprint image to an artificial neural network (ANN).

The apparatus may further include: a sensor configured to receive an input fingerprint image, wherein the one or more processors are further configured to determine whether an input fingerprint included in the input fingerprint image is a fake fingerprint based on a fake fingerprint embedding vector that is provided in advance, the enrollment fingerprint embedding vector, the virtual enrollment fingerprint embedding vector, and the virtual fake fingerprint embedding vector.

In another general aspect, an apparatus includes: a sensor configured to receive an input fingerprint image; and one or more processors configured to determine whether an input fingerprint included in the input fingerprint image is a fake fingerprint, based on a fake fingerprint embedding vector, an enrollment fingerprint embedding vector, and a virtual enrollment fingerprint embedding vector that are provided in advance, wherein the enrollment fingerprint embedding vector is obtained based on an enrollment fingerprint image, and the virtual enrollment fingerprint embedding vector is generated by inputting the enrollment fingerprint image to an artificial neural network (ANN).

The virtual enrollment fingerprint embedding vector may be generated to have an environmental characteristic different from an environmental characteristic of the enrollment fingerprint image and maintain a structural characteristic of the enrollment fingerprint image.

The one or more processors may be further configured to: obtain an input fingerprint embedding vector corresponding to the input fingerprint image; determine a confidence value of the input fingerprint embedding vector based on the fake fingerprint embedding vector, the enrollment fingerprint embedding vector, and the virtual enrollment fingerprint embedding vector; and determine, based on the confidence value, whether the input fingerprint input fingerprint image is the fake fingerprint.

In another general aspect, a processor-implemented method includes: obtaining an enrollment fingerprint embedding vector corresponding to an enrollment fingerprint image; generating a first virtual enrollment fingerprint embedding vector having a structural characteristic of the enrollment fingerprint image and an environmental characteristic corresponding to a dry fingerprint; and generating a second virtual enrollment fingerprint embedding vector having the structural characteristic of the enrollment fingerprint image and an environmental characteristic corresponding to a wet fingerprint.

The method may further include: receiving an input fingerprint image; and determining whether an input fingerprint included in the input fingerprint image is a fake fingerprint based on a fake fingerprint embedding vector stored in a database, the enrollment fingerprint embedding vector, the first virtual enrollment fingerprint embedding vector, and the second virtual enrollment fingerprint embedding vector.

The generating of the first virtual enrollment fingerprint embedding vector may include generating the first virtual enrollment fingerprint embedding vector by inputting the enrollment fingerprint image to a first artificial neural network (ANN). The generating of the second virtual enrollment fingerprint embedding vector may include generating the second virtual enrollment fingerprint embedding vector by inputting the enrollment fingerprint image to a second ANN.

The method may further include: generating a virtual fake fingerprint embedding vector by inputting the enrollment fingerprint image to a third ANN; receiving an input fingerprint image; and determining whether an input fingerprint included in the input fingerprint image is a fake fingerprint, based on a fake fingerprint embedding vector stored in a database, the enrollment fingerprint embedding vector, the first virtual enrollment fingerprint embedding vector, the second virtual enrollment fingerprint embedding vector, and the virtual fake fingerprint embedding vector.

Other features and aspects will be apparent from the following detailed description, the drawings, and the claims.

Figure 1:
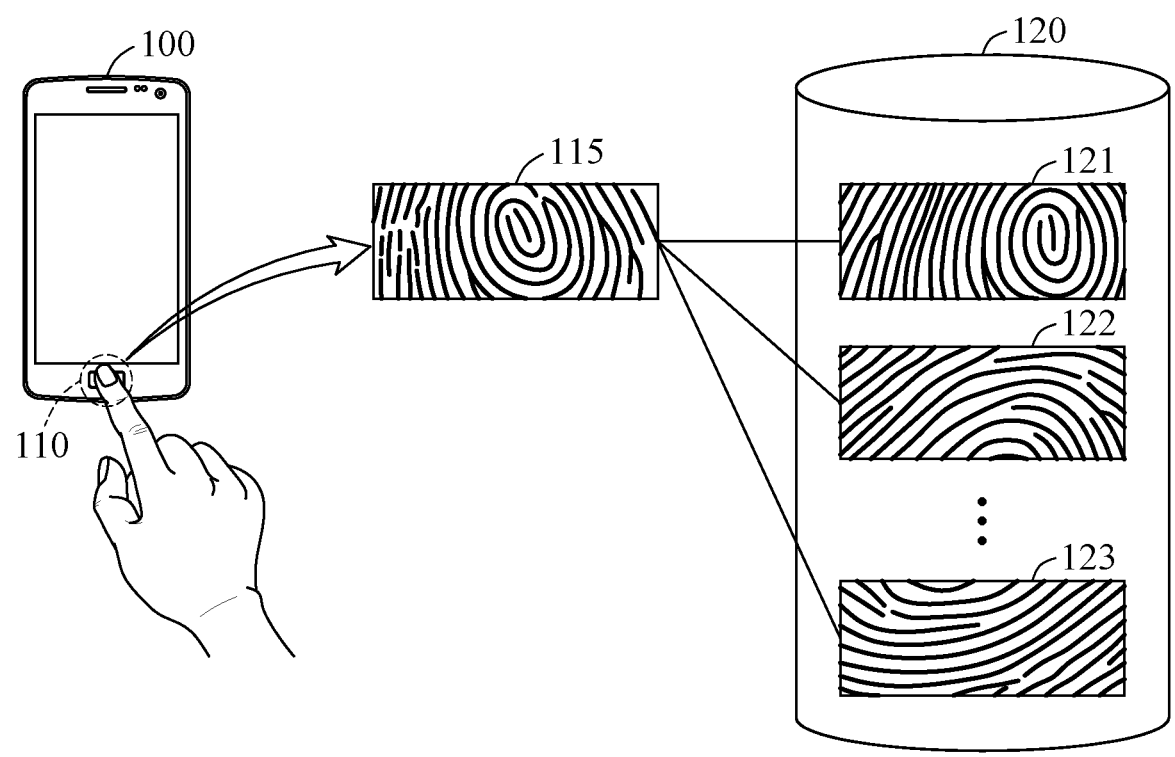
FIG. 1 illustrates an example of biometric information recognition.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Examples described herein may be implemented as various forms of products including, for example, a personal computer (PC), a laptop computer, a tablet computer, a smartphone, a television (TV), a smart home appliance, an intelligent vehicle, a kiosk, or a wearable device.

FIG. 1 illustrates an example of biometric information recognition. In the following description, for convenience of description, biometric information is assumed to be a fingerprint. However, examples described herein may be equally applicable to a variety of biometric information that may be recognized in a form of an image, for example, a vein or an iris.

Referring to FIG. 1, a fingerprint recognition apparatus 100 may include, for example, a fingerprint sensor 110 configured to sense a fingerprint of a user. The fingerprint recognition apparatus 100 may obtain an input fingerprint image 115 representing the fingerprint of the user, using the fingerprint sensor 110.

Fingerprint enrollment may be performed to recognize a fingerprint. Enrollment fingerprint images 121, 122, and 123 may be stored in advance in an enrollment fingerprint database (DB) 120 through a fingerprint enrollment process. The enrollment fingerprint DB 120 may be stored in a memory included in the fingerprint recognition apparatus 100, or an external device such as a server that may communicate with the fingerprint recognition apparatus 100.

For example, when the fingerprint recognition apparatus 100 receives the input fingerprint image 115 for authentication, the fingerprint recognition apparatus 100 may recognize the fingerprint of the user by comparing a fingerprint (hereinafter, an "input fingerprint") included in the input fingerprint image 115 to enrollment fingerprints shown in the enrollment fingerprint images 121 through 123.

When a fake fingerprint is sensed in the input fingerprint image 115 and when the input fingerprint image 115 and the enrollment fingerprint image 123 have similar fingerprint patterns, authentication of the fake fingerprint may be likely to succeed. To remedy such misrecognition, a process of determining whether the input fingerprint of the input fingerprint image 115 is a fake fingerprint or a real fingerprint of a person is required. Depending on examples, the fingerprint recognition apparatus 100 may include an apparatus for detecting a fake fingerprint, hereinafter referred to as a "fake fingerprint detection apparatus", to determine whether the input fingerprint is a fake fingerprint using the fake fingerprint detection apparatus.

A fake fingerprint detector according to a related art is designed based on a training DB provided in advance. In other words, a fake fingerprint detector implemented by a neural network may be trained using the training DB, so that a real fingerprint and a fake fingerprint may be distinguished. However, a performance of the fake fingerprint detector designed based on the training DB may be decreased due to a difference between biometric features (for example, a crack of a fingerprint, or a relatively pale fingerprint) based on actual users. Since biometric information used to train the neural network is not used for authentication, the performance may decrease in a situation in which it is difficult to train the neural network. Furthermore, when a new vulnerability related to detection of a fake fingerprint is discovered, the neural network may need to be retrained and, accordingly, an emergency response may be difficult.

To solve the above problems, the fake fingerprint detection apparatus may determine whether the input fingerprint is a fake fingerprint, based on the enrollment fingerprint images 121 through 123. When the fake fingerprint determination apparatus determines whether the input fingerprint is a fake fingerprint based on the enrollment fingerprint images 121 through 123, the fake fingerprint detection apparatus may reflect biological features of a corresponding user, thereby enhancing performance of fake fingerprint determination.

Although most users tend to enroll fingerprint information in a normal fingerprint condition at room temperature, it is not guaranteed that a fingerprint is input under a normal condition in actual fingerprint authentication. For example, fingerprint authentication may be likely to be performed in various environments, such as a dry environment resulting in a dry fingerprint, a wet environment resulting in a wet fingerprint, or a low-temperature environment. An image of a fingerprint may tend to significantly change depending on the above environmental changes. Accordingly, when an environment changes, the input fingerprint image 115 may become different from the enrollment fingerprint images 121 through 123, which may lead to a decrease in a performance of the fake fingerprint detector using fingerprint information.

Figure 2A:
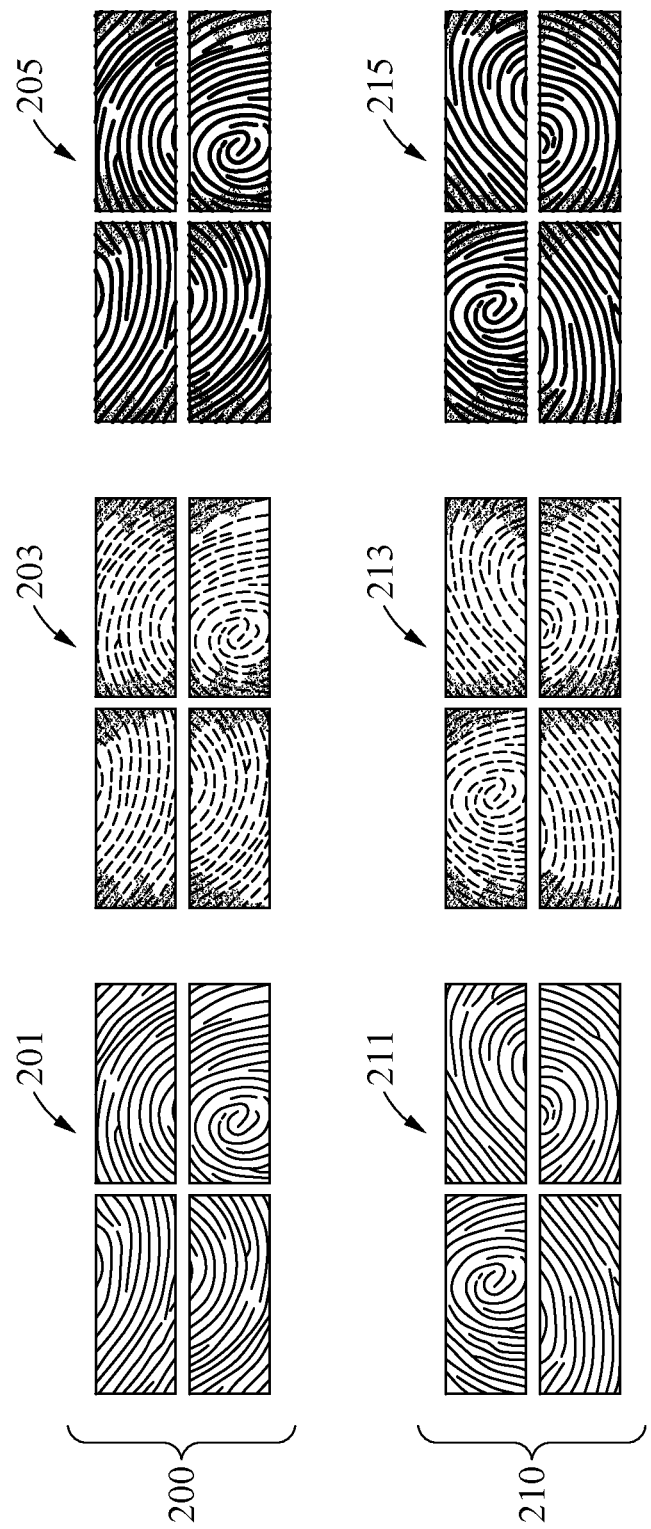
FIGS. 2A and 2B illustrate examples of a change in a performance of a fake fingerprint detection apparatus depending on an environmental change.
Figure 2B:
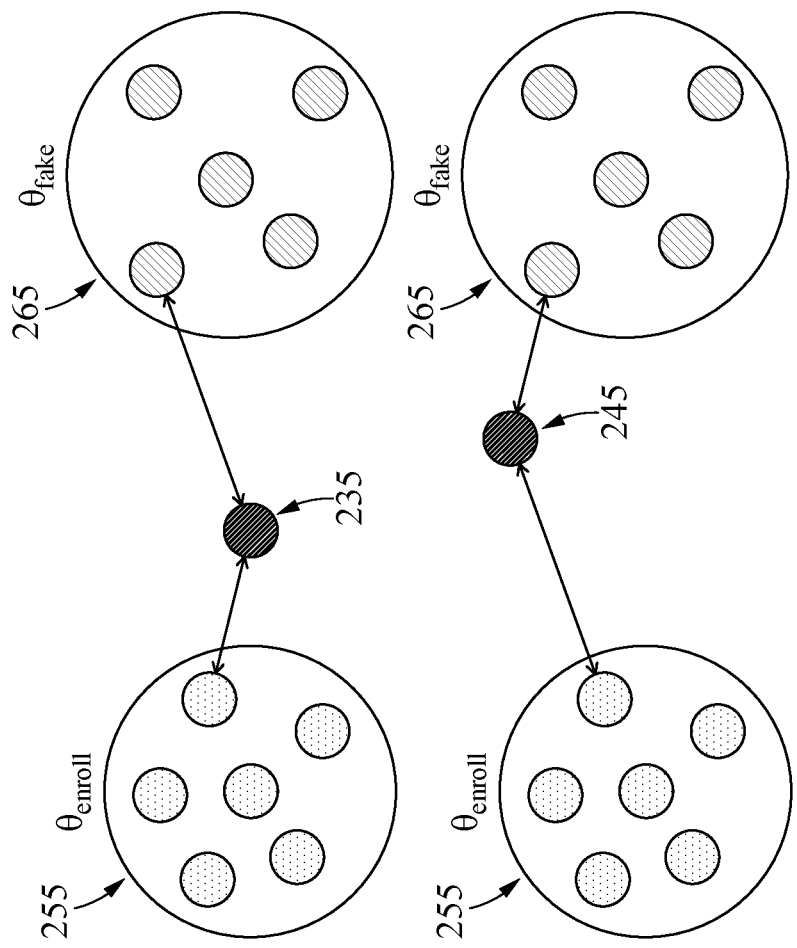
Figure 2B:
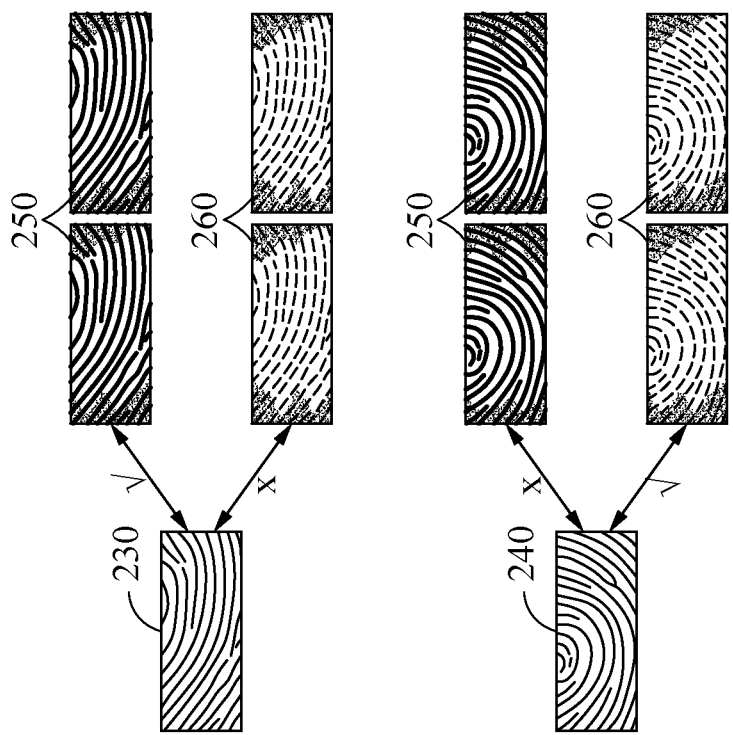

FIGS. 2A and 2B illustrate examples of a change in a performance of a fake fingerprint detection apparatus depending on an environmental change.

Referring to FIG. 2A, fingerprint images 200 are real fingerprint images of a person, and fingerprint images 210 are fake fingerprint images.

An image state of a fingerprint may tend to greatly vary depending on a capturing environment. For example, the real fingerprint images 200 may include a real fingerprint image 201 representing a normal fingerprint, a real fingerprint image 203 representing a dry fingerprint, and a real fingerprint image 205 representing a wet fingerprint may have different characteristics. Also, the fake fingerprint images 210 may include a fake fingerprint image 211 representing a fingerprint forged using silicon, a fake fingerprint image 213 representing a fingerprint forged using wood glue, and a fake fingerprint image 215 representing a fingerprint forged using gelatin may have different characteristics.

The real fingerprint image 203 may have characteristics similar to those of the fake fingerprint image 213, and the real fingerprint image 205 may have characteristics similar to those of the fake fingerprint image 215.

Referring to FIG. 2B, the fake fingerprint detection apparatus may determine whether an input fingerprint image is forged, based on an enrollment fingerprint image 250 and a fake fingerprint image 260. Enrollment fingerprint images 250 may be fingerprint images generated by users enrolling fingerprints in a first environment state. The first environment state may be, for example, a normal fingerprint condition at room temperature.

It may be determined whether fingerprint images are similar based on whether embedding vectors corresponding to the fingerprint images are similar. An embedding vector may include information used to distinguish authentication elements, and may include, for example, a component compressed and required for authentication in a fingerprint image. The embedding vector may be referred to as a "feature vector."

The fake fingerprint detection apparatus may receive an input fingerprint image and generate an input embedding vector from the input fingerprint image. The input embedding vector may compress a component required for authentication in the input fingerprint image and include the compressed component.

The fake fingerprint detection apparatus may obtain an enrollment fingerprint embedding vector corresponding to an enrollment fingerprint image, and a fake fingerprint embedding vector corresponding to a fake fingerprint image. The fake fingerprint embedding vector may be an embedding vector corresponding to a fake fingerprint training DB in a neural network trained based on a plurality of unspecified fingerprint training DBs provided in advance.

The fake fingerprint detection apparatus may determine whether an input fingerprint embedding vector is forged based on the enrollment fingerprint embedding vector and the fake fingerprint embedding vector. For example, when a confidence value of an input fingerprint embedding vector is greater than or equal to a predetermined threshold, the fake fingerprint detection apparatus may determine an input fingerprint to be a real fingerprint. When the confidence value is less than the threshold, the fake fingerprint detection apparatus may determine the input fingerprint to be a fake fingerprint.

In an example, the fake fingerprint detection apparatus may receive a real fingerprint image 230 representing a normal fingerprint as an input fingerprint image and may determine whether an input fingerprint included in the real fingerprint image 230 is a fake fingerprint. For example, the fake fingerprint detection apparatus may determine that the input fingerprint in the real fingerprint image 230 is a real fingerprint of a person, not a fake fingerprint, because an input fingerprint embedding vector 235 corresponding to the real fingerprint image 230 is similar to an enrollment fingerprint embedding vector 255 corresponding to an enrollment fingerprint image 250 rather than a fake fingerprint embedding vector 265 corresponding to a fake fingerprint image 260.

In another example, the fake fingerprint detection apparatus may receive a real fingerprint image 240 representing a dry fingerprint as an input fingerprint image and may determine whether an input fingerprint included in the real fingerprint image 240 is a fake fingerprint. For example, the fake fingerprint detection apparatus may incorrectly determine that the input fingerprint in the real fingerprint image 240 is a fake fingerprint, because an input fingerprint embedding vector 245 corresponding to the real fingerprint image 240 is similar to the fake fingerprint embedding vector 265 corresponding to the fake fingerprint image 260 rather than the enrollment fingerprint embedding vector 255 corresponding to the enrollment fingerprint image 250.

As described above, since fingerprint enrollment is performed only once in a predetermined environment, the fake fingerprint detection apparatus may incorrectly determine a real fingerprint of a person to be a fake fingerprint in an environment different from an environment at a point in time of enrollment. Hereinafter, fake fingerprint determination based on a virtual enrollment fingerprint embedding vector generated based on an enrollment fingerprint image will be described with reference to FIGS. 3 through 8B. The fake fingerprint detection apparatus may input an enrollment fingerprint image of a normal fingerprint to an artificial neural network (ANN) capable of changing a condition of a fingerprint to a dry condition, a wet condition or a low temperature condition, for example, may generate a virtual enrollment image that has a changed environmental characteristic while maintaining a structural characteristic, and may use the virtual enrollment image to determine whether an input fingerprint is a fake fingerprint.

Figure 3:
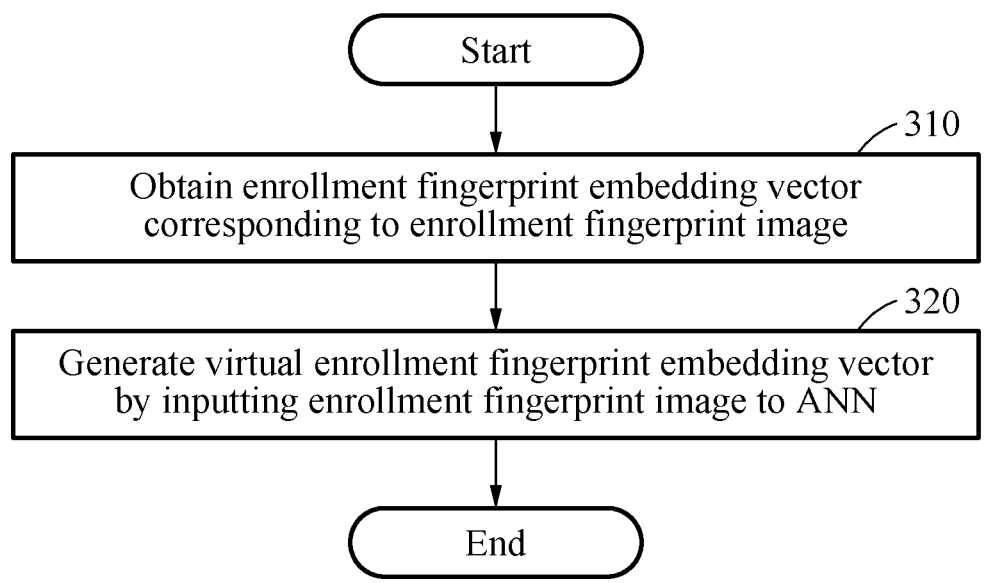
FIG. 3 illustrates an example of generating a virtual enrollment fingerprint embedding vector.

FIG. 3 illustrates an example of generating a virtual enrollment fingerprint embedding vector.

Referring to FIG. 3, operations 310 and 320 may be performed by the fake fingerprint detection apparatus described above with reference to FIG. 1. The fake fingerprint detection apparatus may be implemented by one or more hardware modules, one or more software modules, or various combinations of hardware and software modules.

In operation 310, the fake fingerprint detection apparatus obtains an enrollment fingerprint embedding vector corresponding to an enrollment fingerprint image. For example, in an enrollment operation, the fake fingerprint detection apparatus may obtain an enrollment fingerprint embedding vector corresponding to at least one enrollment fingerprint image. The enrollment fingerprint embedding vector may be stored in advance in the enrollment fingerprint DB 120 of FIG. 1.

The fake fingerprint detection apparatus may assume fingerprints included in all enrollment fingerprint images to be real fingerprints and may generate an enrollment fingerprint embedding vector corresponding to each enrollment fingerprint image. The fake fingerprint detection apparatus may obtain an enrollment embedding vector corresponding to an enrollment fingerprint image using an embedding vector extractor, and may store the enrollment embedding vector in the enrollment fingerprint DB 120.

In operation 320, the fake fingerprint detection apparatus may generate a virtual enrollment fingerprint embedding vector by inputting the enrollment fingerprint image to an ANN. The ANN may be trained so that the virtual enrollment fingerprint embedding vector may have an environmental characteristic different from that of the enrollment fingerprint image while maintaining a structural characteristic of the enrollment fingerprint image. The structural characteristic of the enrollment fingerprint image may be an unchanged identity such as a shape of the enrollment fingerprint image. The environmental characteristic of the enrollment fingerprint image may refer to various environmental characteristics of an environment when a fingerprint is enrolled, for example, a dry fingerprint characteristic, a wet fingerprint characteristic, or a fingerprint characteristic under a low temperature condition.

The fake fingerprint detection apparatus may input the enrollment fingerprint image to the ANN, and may generate at least one virtual enrollment fingerprint embedding vector having an environmental characteristic different from that of the enrollment fingerprint image while maintaining the structural characteristic of the enrollment fingerprint image.

In addition, since an operation of generating a virtual enrollment fingerprint embedding vector is performed during a fingerprint enrollment process, not an authentication process, a time for computation in the authentication process may not be significantly increased, and robustness against environmental changes may be enhanced.

Figure 4:
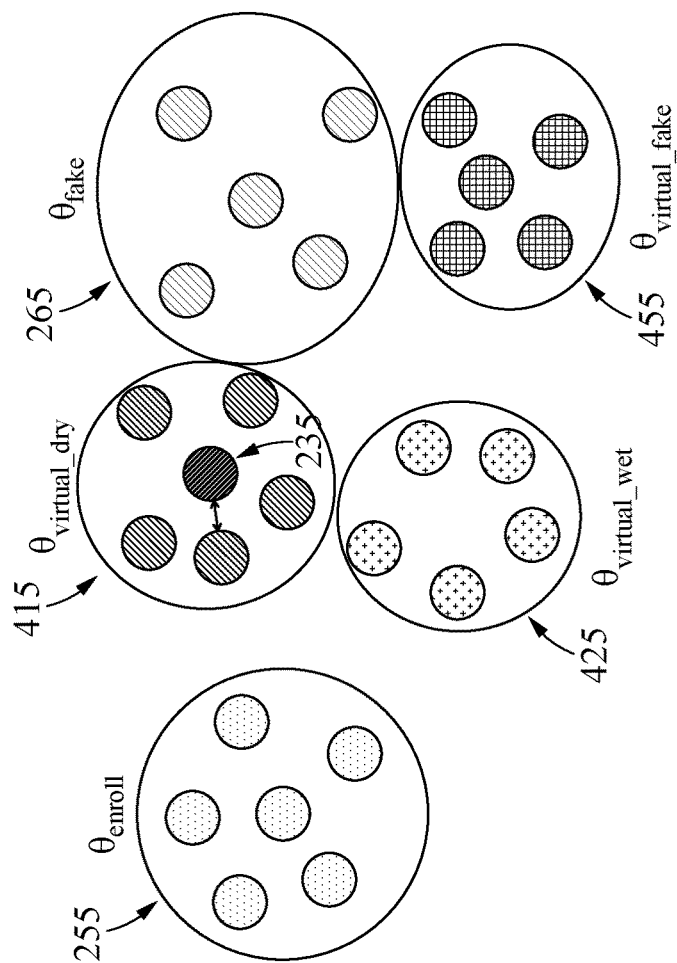
FIG. 4 illustrates an example of determining whether a fingerprint is forged, based on a virtual fake fingerprint embedding vector.
Figure 4:
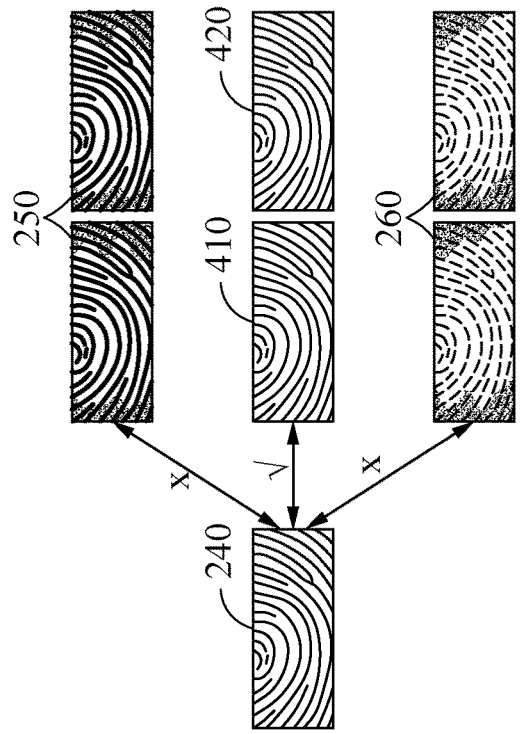

FIG. 4 illustrates an example of determining whether a fingerprint is forged, based on a virtual fake fingerprint embedding vector.

Referring to FIG. 4, a fake fingerprint detection apparatus determines whether an input fingerprint image is forged, based on virtual enrollment fingerprint images 410 and 420 in addition to an enrollment fingerprint image 250 and a fake fingerprint image 260. For example, the fake fingerprint detection apparatus may determine whether an input fingerprint embedding vector is forged, based on a dry-condition virtual enrollment fingerprint embedding vector 415 corresponding to a virtual enrollment fingerprint image 410 representing a dry fingerprint, and a wet-condition virtual enrollment fingerprint embedding vector 425 corresponding to a virtual enrollment fingerprint image 420 representing a wet fingerprint, in addition to an enrollment fingerprint embedding vector 255 and a fake fingerprint embedding vector 265.

Also, the fake fingerprint detection apparatus may input the enrollment fingerprint image 250 to an ANN, and may generate a virtual fake fingerprint embedding vector 455 having a characteristic of a fake fingerprint, for example, silicon, wood glue, or gelatin, while maintaining a structural characteristic of the enrollment fingerprint image 250. The fake fingerprint detection apparatus may further use the virtual fake fingerprint embedding vector 455 to enhance a performance of determining whether the input fingerprint image is forged.

For example, the fake fingerprint detection apparatus may receive a real fingerprint image 240 representing a dry fingerprint as an input fingerprint image, and may determine whether an input fingerprint included in the real fingerprint image 240 is a fake fingerprint. Referring to FIG. 2B, when the enrollment fingerprint image 250 and the fake fingerprint image 260 are used, the input fingerprint in the real fingerprint image 240 may be incorrectly determined as a fake fingerprint. However, since the input fingerprint embedding vector 245 corresponding to the real fingerprint image 240 is most similar to the dry-condition virtual enrollment fingerprint embedding vector 415 corresponding to the virtual enrollment fingerprint image 410, the fake fingerprint detection apparatus may determine the input fingerprint included in the input fingerprint embedding vector 245 corresponding to the real fingerprint image 240 as a real fingerprint of a person, not a fake fingerprint. An example of generating a virtual enrollment fingerprint embedding vector will be further described below with reference to FIGS. 5A through 6.

Figure 5A:
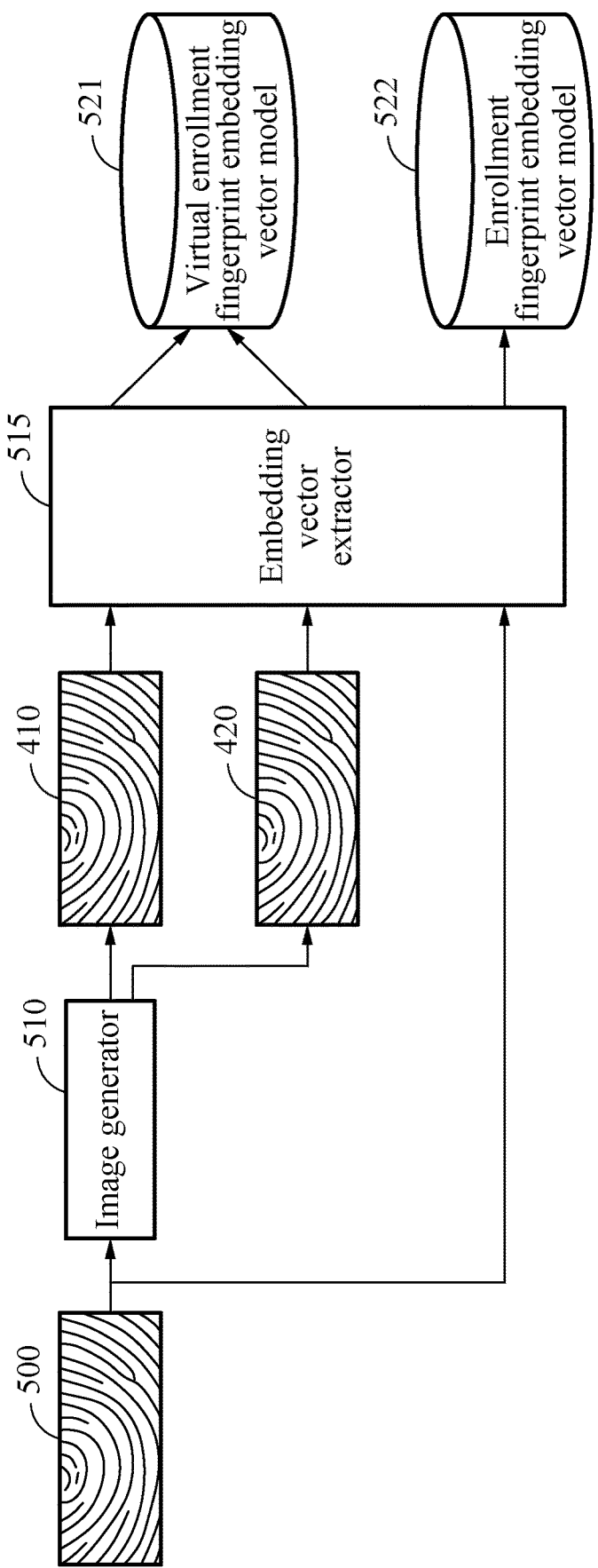
FIGS. 5A through 5C illustrate examples of generating a virtual enrollment fingerprint embedding vector.
Figure 5B:
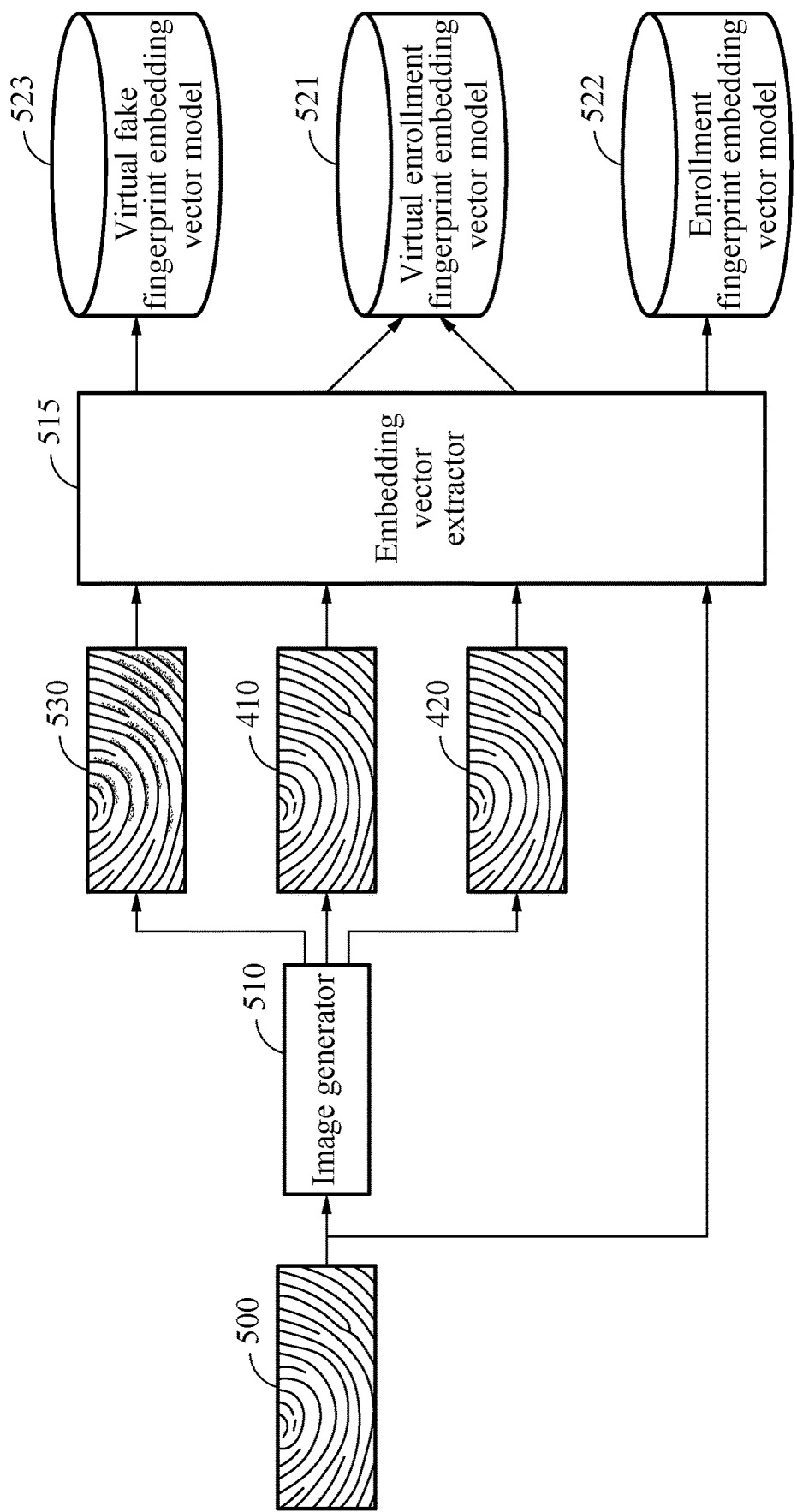
Figure 5C:
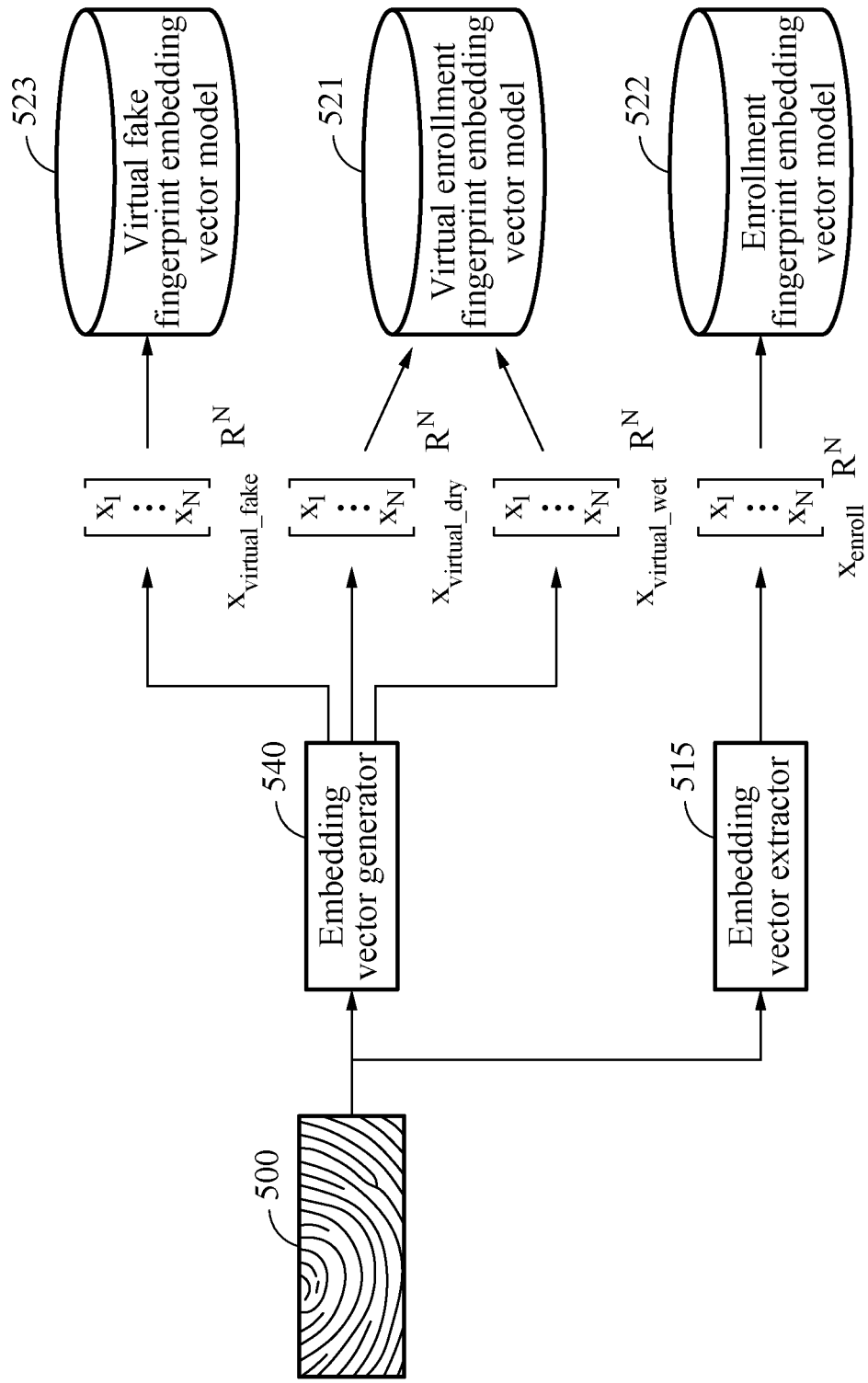

FIGS. 5A through 5C illustrate examples of generating a virtual enrollment fingerprint embedding vector.

Referring to FIG. 5A, a fake fingerprint detection apparatus may generate virtual enrollment fingerprint images 410 and 420 by inputting an enrollment fingerprint image 500 to an image generator 510 constructed with the above-described ANN.

The fake fingerprint detection apparatus may input the virtual enrollment fingerprint image 410 representing a dry fingerprint to an embedding vector extractor 515, and may generate a dry-condition virtual enrollment fingerprint embedding vector set that includes at least one virtual enrollment fingerprint embedding vector corresponding to the dry fingerprint. Similarly, the fake fingerprint detection apparatus may input the virtual enrollment fingerprint image 420 representing a wet fingerprint to the embedding vector extractor 515, and may generate a wet-condition virtual enrollment fingerprint embedding vector set that includes at least one virtual enrollment fingerprint embedding vector corresponding to the wet fingerprint.

The fake fingerprint detection apparatus may construct a virtual enrollment fingerprint embedding vector model 521 based on the generated dry-condition virtual enrollment fingerprint embedding vector set and the generated wet-condition virtual enrollment fingerprint embedding vector set.

Also, the fake fingerprint detection apparatus may input the enrollment fingerprint image 500 to the embedding vector extractor 515, may generate an enrollment fingerprint embedding vector, and may construct an enrollment fingerprint embedding vector model 522 based on the enrollment fingerprint embedding vector. The virtual enrollment fingerprint embedding vector model 521 and the enrollment fingerprint embedding vector model 522 may be stored in the enrollment fingerprint DB 120 of FIG. 1.

Referring to FIG. 5B, the fake fingerprint detection apparatus may input the enrollment fingerprint image 500 to the image generator 510, to further generate a virtual fake fingerprint image 530. The fake fingerprint detection apparatus may determine whether an input fingerprint image is forged, based on the virtual fake fingerprint image 530 that maintains a structural characteristic of the enrollment fingerprint image 500, and accordingly a performance of determining whether an input fingerprint image is forged may be enhanced.

The fake fingerprint detection apparatus may input the virtual fake fingerprint image 530 to the embedding vector extractor 515, and may generate a virtual fake fingerprint embedding vector set including at least one virtual fake fingerprint embedding vector, and may construct a virtual fake fingerprint embedding vector model 523 based on the virtual fake fingerprint embedding vector set.

Referring to FIG. 5C, the fake fingerprint detection apparatus may generate a virtual enrollment fingerprint embedding vector directly from the enrollment fingerprint image 500, instead of generating a virtual enrollment fingerprint image. The fake fingerprint detection apparatus may input the enrollment fingerprint image 500 to an embedding vector generator 540 constructed with the above-described ANN, and may generate a plurality of virtual enrollment fingerprint embedding vector sets having different environmental characteristics. The fake fingerprint detection apparatus may construct the virtual enrollment fingerprint embedding vector model 521 based on the plurality of virtual enrollment fingerprint embedding vector sets (for example, a dry-condition virtual enrollment fingerprint embedding vector set, and a wet-condition virtual enrollment fingerprint embedding vector set).

Also, the fake fingerprint detection apparatus may input the enrollment fingerprint image 500 to the embedding vector generator 540, may generate a virtual fake fingerprint embedding vector set including at least one virtual fake fingerprint embedding vector, and may construct the virtual fake fingerprint embedding vector model 523 based on the virtual fake fingerprint embedding vector set. Example operations of the image generator 510 and the embedding vector generator 540 will be further described below with reference to FIG. 6.

Figure 6:
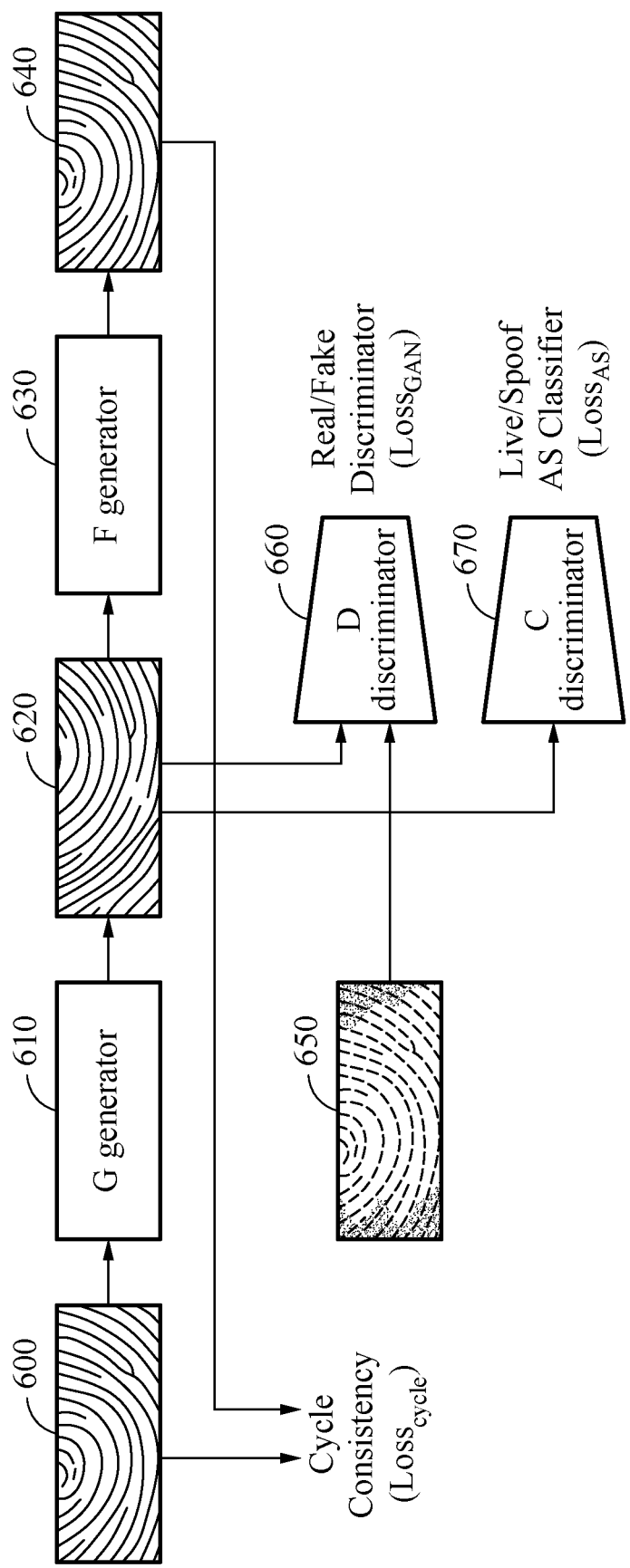
FIG. 6 illustrates example operations each of an image generator and an embedding vector generator.

FIG. 6 illustrates example operations of each of an image generator 510 and the embedding vector generator 540.

Referring to FIG. 6, the image generator 510 and the embedding vector generator 540 may operate based on the same principle. For convenience of description, description is given based on an operation of the image generator 510.

The image generator 510 may be implemented by an ANN, and the ANN may be trained so that a virtual enrollment fingerprint image may have an environmental characteristic different from that of an enrollment fingerprint image 600 while maintaining a structural characteristic of the enrollment fingerprint image 600.

The ANN may include a G generator 610, an F generator 630, a D discriminator 660, and a C discriminator 670. The ANN may generate desired output data without a pair of training data.

The G generator 610 may convert the enrollment fingerprint image 600 into a virtual enrollment fingerprint image 620, and the F generator 630 may restore the virtual enrollment fingerprint image 620 to an enrollment fingerprint image. The ANN may determine a model parameter that minimizes a difference between an enrollment fingerprint image 640 restored in a training operation and the original enrollment fingerprint image 600.

The D discriminator 660 may function to allow the virtual enrollment fingerprint image 620 to have a desired environmental characteristic. The D discriminator 660 may be trained so that the virtual enrollment fingerprint image 620 may have a predetermined environmental characteristic based on fingerprint images 650 having predetermined environmental characteristics. For example, to train the virtual enrollment fingerprint image 620 as a virtual enrollment fingerprint image representing a dry fingerprint, the ANN may determine a model parameter that minimizes a difference between fingerprint images representing dry fingerprints and the virtual enrollment fingerprint image 620.

The C discriminator 670 may function to allow the virtual enrollment fingerprint image 620 to have a characteristic of a real fingerprint image, not a fake fingerprint image. As described above, the real fingerprint image 203 representing the dry fingerprint and the fake fingerprint image 213 representing the fingerprint forged using the wood glue may have similar characteristics, and the real fingerprint image 205 representing the wet fingerprint and the fake fingerprint image 215 representing the fingerprint forged using the gelatin may have similar characteristics. Accordingly, the C discriminator 670 may determine a model parameter that minimizes a difference between the virtual enrollment fingerprint image 620 and a real fingerprint image.

The ANN may be trained in order to determine a model parameter that minimizes a loss function. The loss function may be used as an indicator to determine an optimal model parameter in a process of training the ANN. A model parameter may be a parameter determined through training, and may include a weight of a synaptic connection (activation function) or a bias of a neuron (node). Also, a hyperparameter may be a parameter that needs to be set before learning in a machine learning algorithm, and may include a learning rate, a number of repetitions, a mini-batch size, or an initialization function. The loss function may be expressed as shown in Equation 1 below.

$$\text{Loss}=\text{Loss}_{GAN}(G,D,I_E,I_V)+\text{Loss}_{GAN}(F,D,I_V,I_E)+\lambda_1\text{Loss}_{cycle}(G,F)+\lambda_2\text{Loss}_{AS}(G,F) \quad \text{Equation 1}$$

In Equation 1, $I_E$ is the enrollment fingerprint image 600, $I_V$ is the virtual enrollment fingerprint image 620, G is a function of converting the enrollment fingerprint image 600 into the virtual enrollment fingerprint image 620, F is a function of converting the virtual enrollment fingerprint image 620 into the restored enrollment fingerprint image 640, and D is a discriminator that determines whether the virtual enrollment fingerprint image 620 has a predetermined environmental characteristic.

Figure 7:
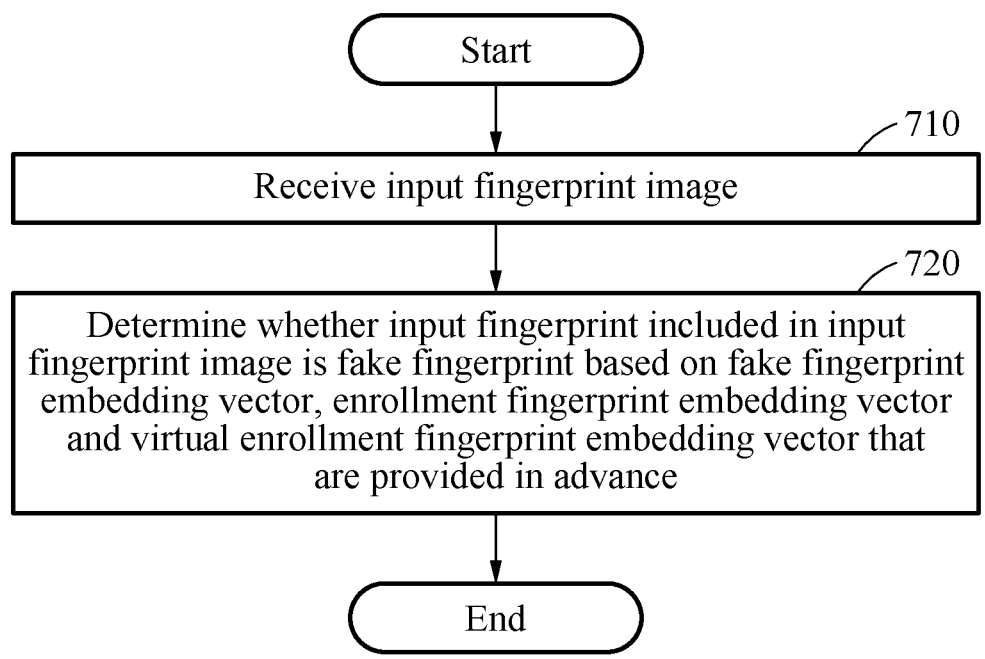
FIG. 7 is a flowchart illustrating an example of fake fingerprint detection.

FIG. 7 is a flowchart illustrating an example of detecting a fake fingerprint.

Referring to FIG. 7, operations 710 and 720 may be performed by the fingerprint recognition apparatus 100 described above with reference to FIG. 1. The fingerprint recognition apparatus 100 may be implemented by one or more hardware modules, one or more software modules, or various combinations of hardware and software modules.

In operation 710, the fingerprint recognition apparatus 100 receives an input fingerprint image.

In operation 720, the fingerprint recognition apparatus 100 may determine whether an input fingerprint included in the input fingerprint image is a fake fingerprint, based on a fake fingerprint embedding vector, an enrollment fingerprint embedding vector, and a virtual enrollment fingerprint embedding vector that are provided in advance. The enrollment fingerprint embedding vector and the virtual enrollment fingerprint embedding vector may be stored in the enrollment fingerprint DB 120 in advance in an enrollment operation. For example, the fingerprint recognition apparatus 100 of FIG. 1 may perform authentication based on a result of the determining of whether the input fingerprint is a fake fingerprint, and may determine whether to provide a user access to one or more features or operations of the fingerprint recognition apparatus 100, based on a result of the authentication. For example, the fingerprint recognition apparatus 100 may provide the user access to the one or more features or operations of the fingerprint recognition apparatus 100 if it is determined that the input fingerprint is not a fake fingerprint, and may deny the user access to the one or more features or operations of the fingerprint recognition apparatus 100 if it is determined that the input fingerprint is a fake fingerprint.

An example of determining whether an input fingerprint image is forged will be further described below with reference to FIGS. 8A and 8B.

Figure 8A:
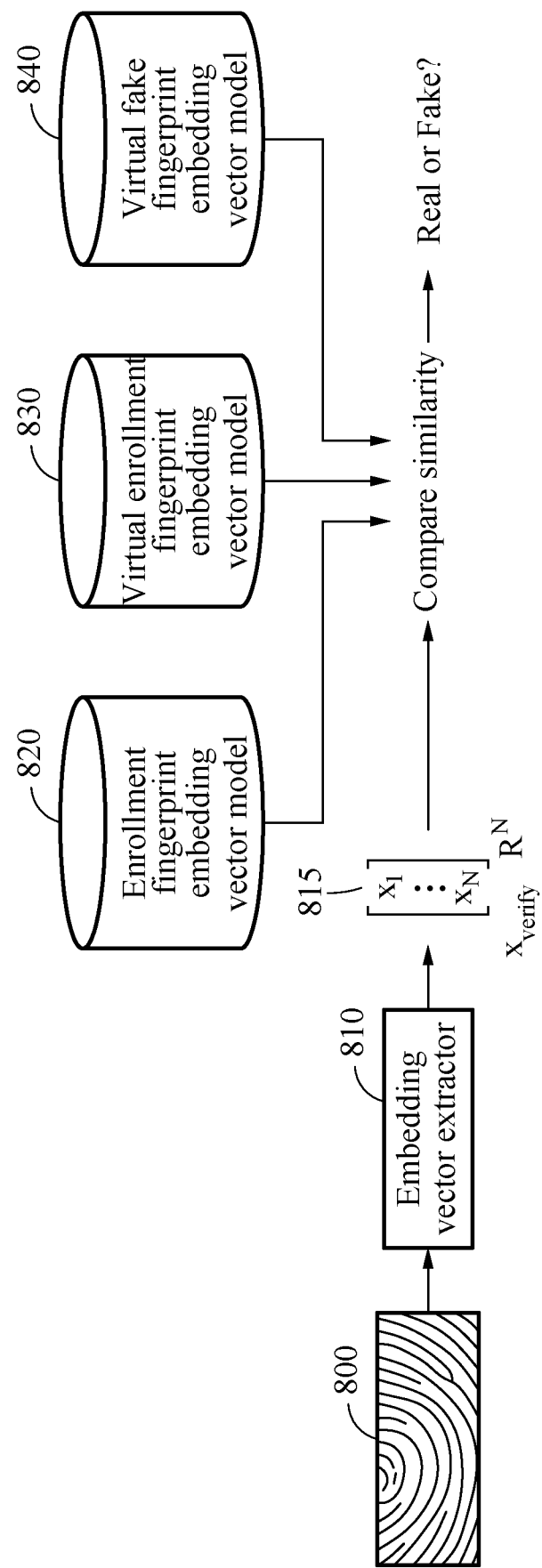
FIGS. 8A and 8B illustrates examples of determining whether an input fingerprint image is forged.
Figure 8B:
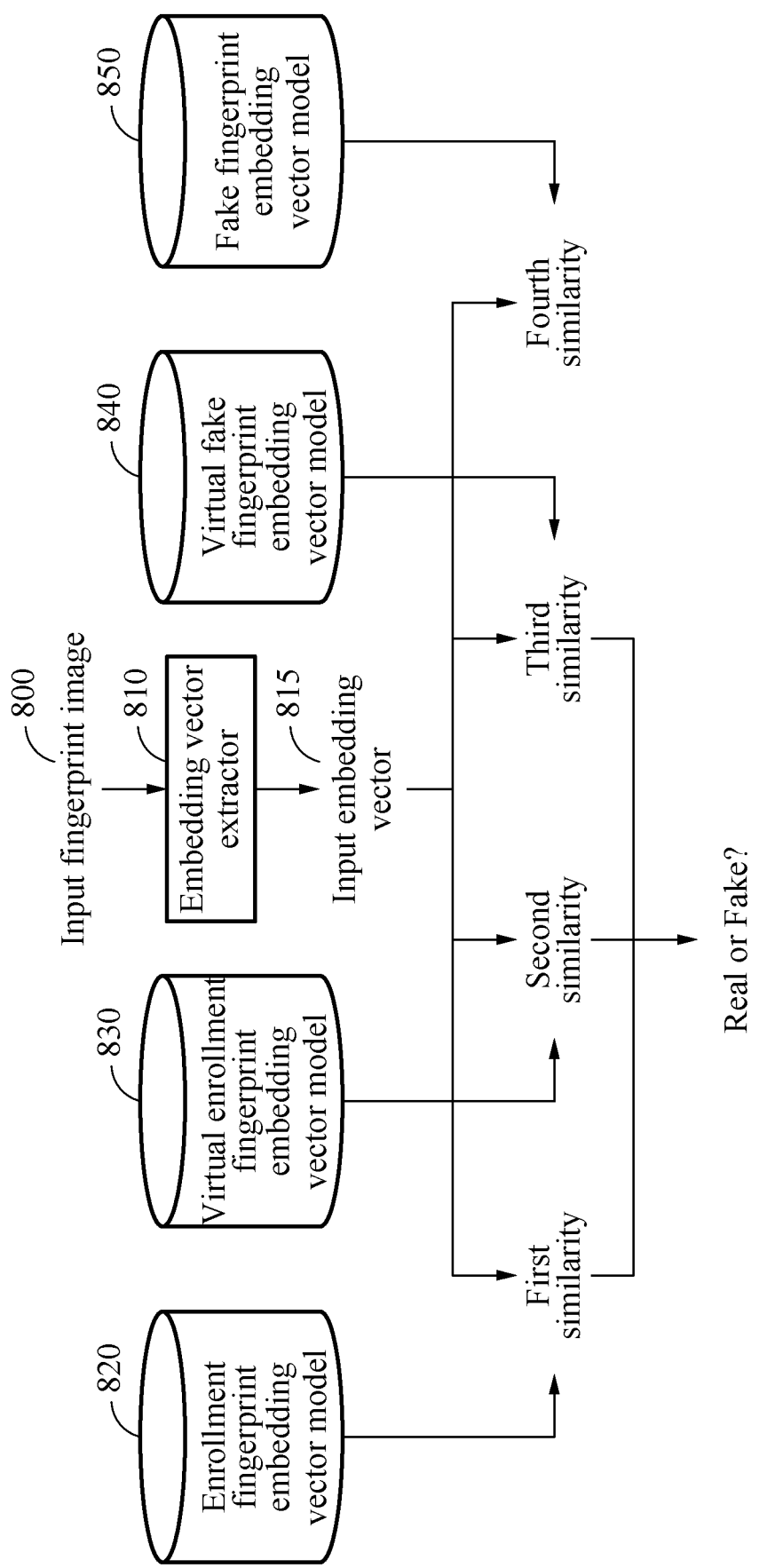

FIGS. 8A and 8B illustrates examples of determining whether an input fingerprint image is forged.

Referring to FIG. 8A, a fake fingerprint detection apparatus may input an input fingerprint image 800 to an embedding vector extractor 810, and may generate an input embedding vector 815.

The fake fingerprint detection apparatus may determine whether the input embedding vector 815 is forged, based on an enrollment fingerprint embedding vector model 820, a virtual enrollment fingerprint embedding vector model 830, a virtual fake fingerprint embedding vector model 840, and a fake fingerprint embedding vector model 850. Descriptions of the enrollment fingerprint embedding vector model 522, the virtual enrollment fingerprint embedding vector model 521, and the virtual fake fingerprint embedding vector model 523 of FIGS. 5A through 5C are applicable to the enrollment fingerprint embedding vector model 820, the virtual enrollment fingerprint embedding vector model 830, and the virtual fake fingerprint embedding vector model 840 of FIG. 8A. Accordingly, further descriptions of operations of the enrollment fingerprint embedding vector model 820, the virtual enrollment fingerprint embedding vector model 830, the virtual fake fingerprint embedding vector model 840, and the fake fingerprint embedding vector model 850 are not repeated herein.

Referring to FIG. 8B, a similarity with the input embedding vector 815 may be calculated based on, for example, a cosine similarity or a distance between the input embedding vector 815 and any one or any combination of any two or more of an enrollment fingerprint embedding vector, a virtual enrollment fingerprint embedding vector, a fake fingerprint embedding vector, and virtual fake fingerprint data. In addition, various types of similarity calculation schemes may be applied.

In an example, the fake fingerprint detection apparatus may estimate a posterior probability between the input embedding vector 815 and any one or any combination of the enrollment fingerprint embedding vector, the virtual enrollment fingerprint embedding vector, the fake fingerprint embedding vector, and the virtual fake fingerprint data, and may determine a confidence value of the input embedding vector 815 based on the estimated posterior probability.

For example, the confidence value of the input embedding vector 815 may be determined as shown in Equation 2 below.

$$\text{Confidence}=w1*\text{First similarity}+w2*\text{Second similarity}+w3*\text{Third similarity}+w4*\text{Fourth similarity} \quad \text{Equation 2}$$

In Equation 2, w1 and w2 may be positive numbers, and w3 and w4 may be negative numbers. When the confidence value of the input embedding vector 815 is greater than or equal to a predetermined threshold, the fake fingerprint detection apparatus may determine an input fingerprint included in an input fingerprint image to be a real fingerprint. When the confidence value of the input embedding vector 815 is less than the threshold, the fake fingerprint detection apparatus may determine the input fingerprint in the input fingerprint image to be a fake fingerprint.

Also, the fake fingerprint detection apparatus may determine whether the input fingerprint image is forged, based on a real fingerprint embedding vector. The real fingerprint embedding vector may be an embedding vector corresponding to a real fingerprint training DB in a neural network trained based on a plurality of unspecified fingerprint training DBs provided in advance. The fake fingerprint detection apparatus may determine an input fingerprint included in the input fingerprint image as a real fingerprint when the input embedding vector 815 is similar to the real fingerprint embedding vector.

Figure 9:
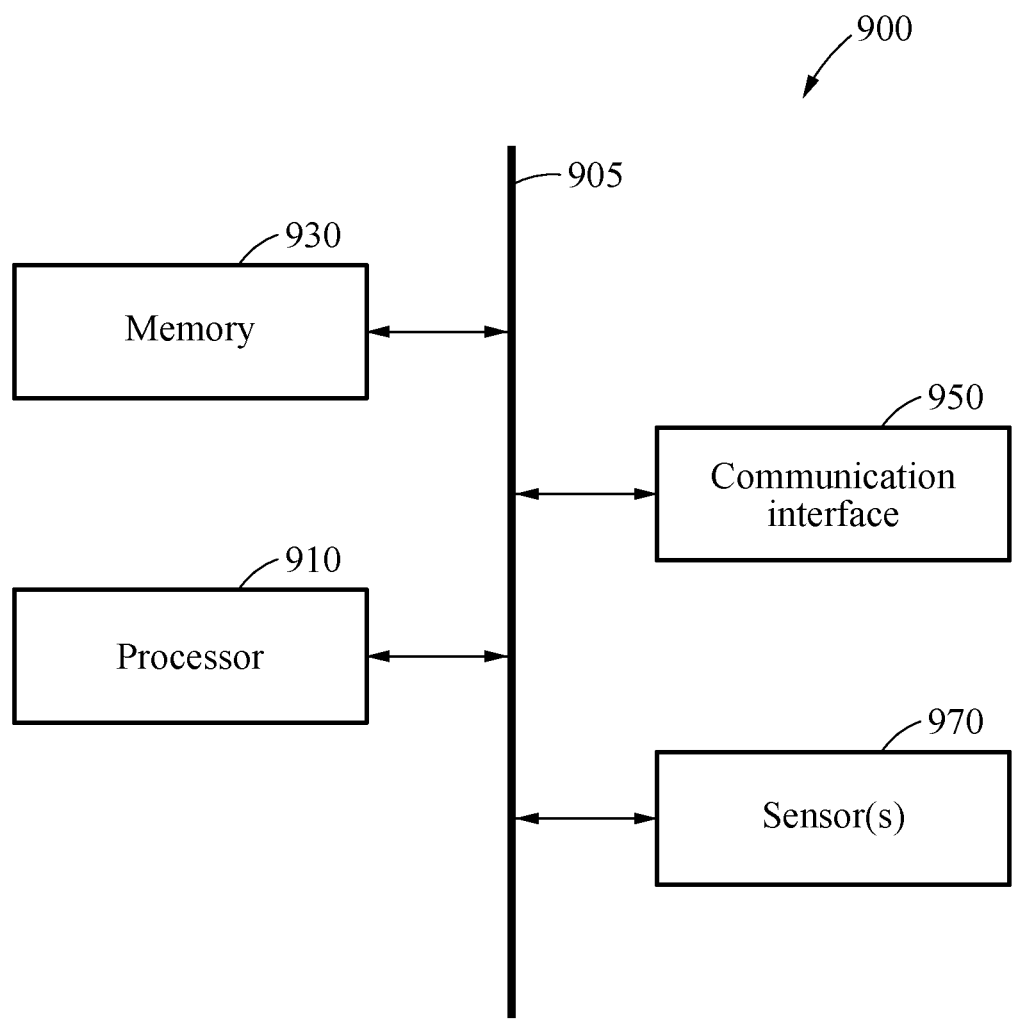
FIG. 9 is a block diagram illustrating an example of an apparatus with fake fingerprint detection.

FIG. 9 is a block diagram illustrating an example of a fake fingerprint detection apparatus 900.

Referring to FIG. 9, the fake fingerprint detection apparatus 900 may include a processor 910, a memory 930, a communication interface 950, and sensors 970. The processor 910, the memory 930, the communication interface 950, and the sensors 970 may communicate with each other via a communication bus 905.

The processor 910 may obtain an enrollment fingerprint embedding vector corresponding to an enrollment fingerprint image, and may generate a virtual enrollment fingerprint embedding vector by inputting the enrollment fingerprint image to an ANN.

The memory 930 may include a DB configured to store an enrollment fingerprint embedding vector and a virtual enrollment fingerprint embedding vector, and a DB configured to store real fingerprint data and fake fingerprint data. The memory 930 may be, for example, a volatile memory, or a non-volatile memory.

The sensors 970 may include, for example, a fingerprint sensor configured to sense a fingerprint of a user.

The processor 910 may obtain a virtual enrollment fingerprint image by inputting the enrollment fingerprint image to the ANN, and may generate a virtual enrollment fingerprint embedding vector corresponding to the virtual enrollment fingerprint image The processor 910 may generate a plurality of virtual enrollment fingerprint embedding vector sets having different environmental characteristics by inputting the enrollment fingerprint image to a plurality of ANNs.

The processor 910 may determine whether an input fingerprint included in the input fingerprint image is a fake fingerprint, based on a fake fingerprint embedding vector that is provided in advance, the enrollment fingerprint embedding vector, and the virtual enrollment fingerprint embedding vector.

The processor 910 may generate a virtual fake fingerprint embedding vector by inputting the enrollment fingerprint image to an ANN.

The processor 910 may determine whether an input fingerprint included in the input fingerprint image is a fake fingerprint based on a fake fingerprint embedding vector that is provided in advance, the enrollment fingerprint embedding vector, the virtual enrollment fingerprint embedding vector, and the virtual fake fingerprint embedding vector.

In addition, the processor 910 may perform at least one of the methods described above with reference to FIGS. 2A through 8B or an algorithm corresponding to at least one of the methods. The processor 910 may execute a program, and may control the fake fingerprint detection apparatus 900. Code of the program executed by the processor 910 may be stored in the memory 930. The fake fingerprint detection apparatus 900 may be connected to an external device (for example, a PC or a network) via an input/output device (not shown), and may exchange data with the external device. The fake fingerprint detection apparatus 900 may be included in various computing apparatuses and/or systems, for example, a smartphone, a tablet computer, a laptop computer, a desktop computer, a TV, a wearable device, a security system, or a smart home system. In an example, the fake fingerprint detection apparatus 900 may also correspond to the fingerprint recognition apparatus 100 of FIG. 1. The ANNs, the image generator 510, the embedding vector extractors 515 and 810, the virtual enrollment fingerprint embedding vector models 521 and 830, the enrollment fingerprint embedding vector models 522 and 820, the virtual fake fingerprint embedding vector models 523 and 840, the fake fingerprint embedding vector model 850, the embedding vector generator 540, the G generator 610, the F generator 630, the D discriminator 660, the C discriminator 670, the fake fingerprint detection apparatus 900, the communication bus 905, the processor 910, the memory 930, the communication interface 950, the fake fingerprint detection apparatuses, processors, and the memories in FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media.

Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
obtaining an enrollment fingerprint embedding vector corresponding to an enrollment fingerprint image; and
generating a virtual enrollment fingerprint embedding vector, wherein the virtual enrollment fingerprint embedding vector has an environmental characteristic different from an environmental characteristic of the enrollment fingerprint image, and has a structural characteristic of the enrollment fingerprint image.

2. The method of claim 1, further comprising:
receiving an input fingerprint image; and
determining whether an input fingerprint included in the input fingerprint image is a fake fingerprint based on a fake fingerprint embedding vector that is provided in advance, the enrollment fingerprint embedding vector, and the virtual enrollment fingerprint embedding vector.

3. The method of claim 1, wherein the generating of the virtual enrollment fingerprint embedding vector comprises:
obtaining a virtual enrollment fingerprint image by inputting the enrollment fingerprint image to an artificial neural network (ANN); and
generating the virtual enrollment fingerprint embedding vector corresponding to the virtual enrollment fingerprint image.

4. The method of claim 1, wherein the generating of the virtual enrollment fingerprint embedding vector comprises generating a plurality of virtual enrollment fingerprint embedding vector sets having different environmental characteristics by inputting the enrollment fingerprint image to a plurality of artificial neural networks (ANNs).

5. The method of claim 1, further comprising:
generating a virtual fake fingerprint embedding vector by inputting the enrollment fingerprint image to an artificial neural network (ANN).

6. The method of claim 5, further comprising:
receiving an input fingerprint image; and
determining whether an input fingerprint included in the input fingerprint image is a fake fingerprint, based on a fake fingerprint embedding vector that is provided in advance, the enrollment fingerprint embedding vector, the virtual enrollment fingerprint embedding vector, and the virtual fake fingerprint embedding vector.

7. A non-transitory computer-readable storage medium storing instructions that, when executed by a processor, cause the processor to perform the method of claim 1.

8. A processor-implemented method, method comprising:
receiving an input fingerprint image; and
determining whether an input fingerprint included in the input fingerprint image is a fake fingerprint, based on a fake fingerprint embedding vector, an enrollment fingerprint embedding vector, and a virtual enrollment fingerprint embedding vector that are provided in advance,
wherein the enrollment fingerprint embedding vector is obtained based on an enrollment fingerprint image, and the virtual enrollment fingerprint embedding vector is generated by inputting the enrollment fingerprint image to an artificial neural network (ANN).

9. The method of claim 8, wherein the virtual enrollment fingerprint embedding vector is generated to have an environmental characteristic different from an environmental characteristic of the enrollment fingerprint image and maintain a structural characteristic of the enrollment fingerprint image.

10. The method of claim 8, further comprising:
obtaining an input fingerprint embedding vector corresponding to the input fingerprint image,
wherein the determining of whether the input fingerprint is the fake fingerprint comprises:
determining a confidence value of the input fingerprint embedding vector based on the fake fingerprint embedding vector, the enrollment fingerprint embedding vector and the virtual enrollment fingerprint embedding vector; and
determining, based on the confidence value, whether the input fingerprint is the fake fingerprint.

11. The method of claim 8, further comprising:
performing user authentication based on a result of the determining of whether the input fingerprint is the fake fingerprint; and
determining whether to provide a user access to one or more features or operations of an apparatus, based on a result of the user authentication.

12. A non-transitory computer-readable storage medium storing instructions that, when executed by a processor, cause the processor to perform the method of claim 8.

13. An apparatus, comprising:
one or more processors configured to:
obtain an enrollment fingerprint embedding vector corresponding to an enrollment fingerprint image; and
generate a virtual enrollment fingerprint embedding vector, wherein the virtual enrollment fingerprint embedding vector has an environmental characteristic different from an environmental characteristic of the enrollment fingerprint image, and has a structural characteristic of the enrollment fingerprint image.

14. The apparatus of claim 13, further comprising:
a sensor configured to receive an input fingerprint image,
wherein the one or more processors are further configured to determine whether an input fingerprint included in the input fingerprint image is a fake fingerprint, based on a fake fingerprint embedding vector that is provided in advance, the enrollment fingerprint embedding vector, and the virtual enrollment fingerprint embedding vector.

15. The apparatus of claim 13, wherein the one or more processors are further configured to:
obtain a virtual enrollment fingerprint image by inputting the enrollment fingerprint image to an artificial neural network (ANN); and
generate the virtual enrollment fingerprint embedding vector corresponding to the virtual enrollment fingerprint image.

16. The apparatus of claim 13, wherein the one or more processors are further configured to generate a plurality of virtual enrollment fingerprint embedding vector sets having different environmental characteristics by inputting the enrollment fingerprint image to a plurality of artificial neural networks (ANNs).

17. The apparatus of claim 13, wherein the one or more processors are further configured to generate a virtual fake fingerprint embedding vector by inputting the enrollment fingerprint image to an artificial neural network (ANN).

18. The apparatus of claim 17, further comprising:
a sensor configured to receive an input fingerprint image,
wherein the one or more processors are further configured to determine whether an input fingerprint included in the input fingerprint image is a fake fingerprint based on a fake fingerprint embedding vector that is provided in advance, the enrollment fingerprint embedding vector, the virtual enrollment fingerprint embedding vector, and the virtual fake fingerprint embedding vector.

19. An apparatus, the apparatus comprising:
a sensor configured to receive an input fingerprint image; and
one or more processors configured to determine whether an input fingerprint included in the input fingerprint image is a fake fingerprint, based on a fake fingerprint embedding vector, an enrollment fingerprint embedding vector, and a virtual enrollment fingerprint embedding vector that are provided in advance,
wherein the enrollment fingerprint embedding vector is obtained based on an enrollment fingerprint image, and the virtual enrollment fingerprint embedding vector is generated by inputting the enrollment fingerprint image to an artificial neural network (ANN).

20. The apparatus of claim 19, wherein the virtual enrollment fingerprint embedding vector is generated to have an environmental characteristic different from an environmental characteristic of the enrollment fingerprint image and maintain a structural characteristic of the enrollment fingerprint image.

21. The apparatus of claim 19, wherein the one or more processors are further configured to:
obtain an input fingerprint embedding vector corresponding to the input fingerprint image;
determine a confidence value of the input fingerprint embedding vector based on the fake fingerprint embedding vector, the enrollment fingerprint embedding vector, and the virtual enrollment fingerprint embedding vector; and
determine, based on the confidence value, whether the input fingerprint input fingerprint image is the fake fingerprint.

22. A processor-implemented method, comprising:
obtaining an enrollment fingerprint embedding vector corresponding to an enrollment fingerprint image;
generating a first virtual enrollment fingerprint embedding vector having a structural characteristic of the enrollment fingerprint image and an environmental characteristic corresponding to a dry fingerprint; and
generating a second virtual enrollment fingerprint embedding vector having the structural characteristic of the enrollment fingerprint image and an environmental characteristic corresponding to a wet fingerprint.

23. The method of claim 22, further comprising:
receiving an input fingerprint image; and
determining whether an input fingerprint included in the input fingerprint image is a fake fingerprint based on a fake fingerprint embedding vector stored in a database, the enrollment fingerprint embedding vector, the first virtual enrollment fingerprint embedding vector, and the second virtual enrollment fingerprint embedding vector.

24. The method of claim 22, wherein the generating of the first virtual enrollment fingerprint embedding vector comprises generating the first virtual enrollment fingerprint embedding vector by inputting the enrollment fingerprint image to a first artificial neural network (ANN), and
wherein the generating of the second virtual enrollment fingerprint embedding vector comprises generating the second virtual enrollment fingerprint embedding vector by inputting the enrollment fingerprint image to a second ANN.

25. The method of claim 24, further comprising:
generating a virtual fake fingerprint embedding vector by inputting the enrollment fingerprint image to a third ANN;
receiving an input fingerprint image; and
determining whether an input fingerprint included in the input fingerprint image is a fake fingerprint, based on a fake fingerprint embedding vector stored in a database, the enrollment fingerprint embedding vector, the first virtual enrollment fingerprint embedding vector, the second virtual enrollment fingerprint embedding vector, and the virtual fake fingerprint embedding vector.

\* \* \* \* \*